Nov. 4, 1952     H. B. BARRETT     2,616,480
BRAKE SHOE RELINING DEVICE

Filed Aug. 28, 1950     2 SHEETS—SHEET 1

INVENTOR
HARRY B. BARRETT

BY Alfred W. Petchaft
ATTORNEY

Nov. 4, 1952            H. B. BARRETT            2,616,480
BRAKE SHOE RELINING DEVICE
Filed Aug. 28, 1950                          2 SHEETS—SHEET 2
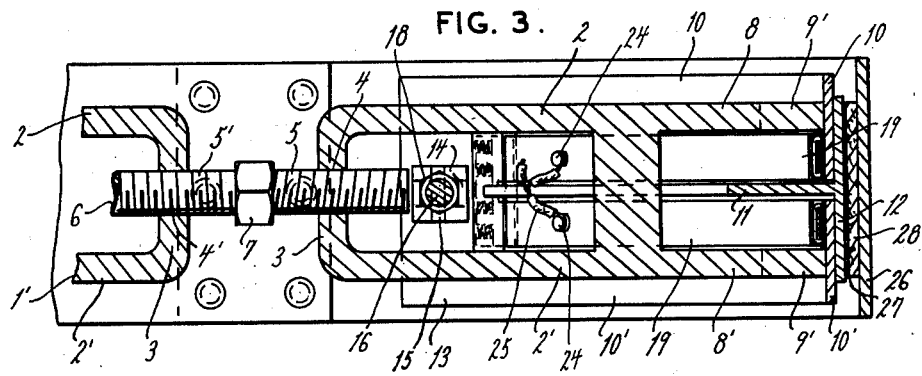
FIG. 3.
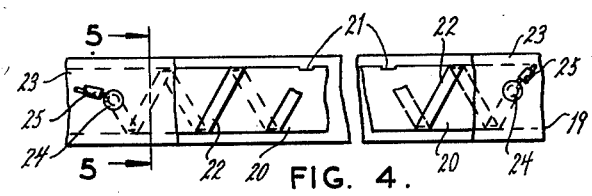
FIG. 4.
FIG. 5.
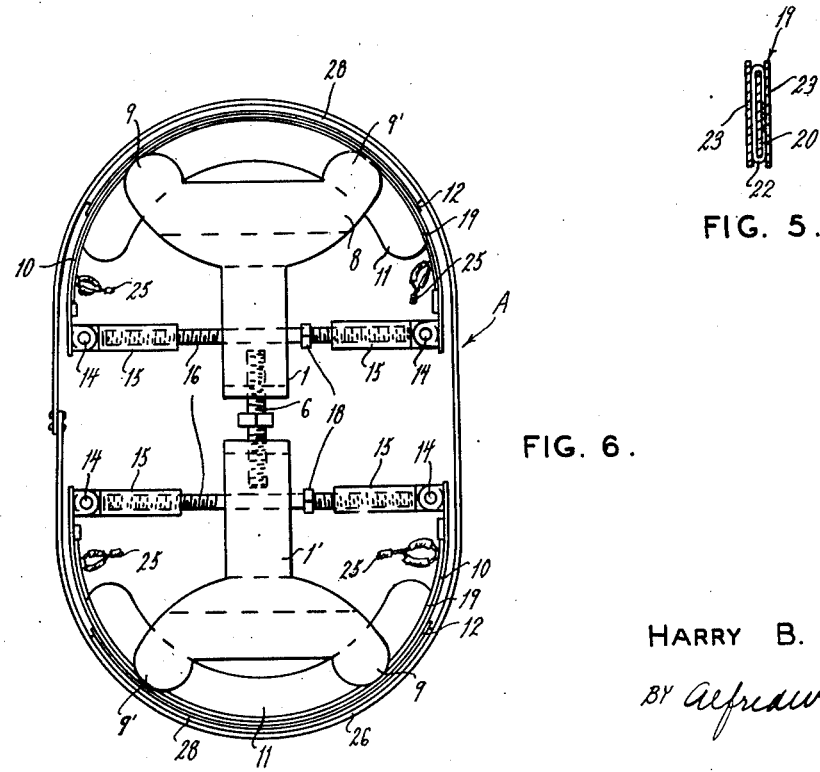
FIG. 6.
INVENTOR
HARRY B. BARRETT
BY Alfred W Petchaft
ATTORNEY Patented Nov. 4, 1952

2,616,480

UNITED STATES PATENT OFFICE 2,616,480

BRAKE SHOE RELINING DEVICE

Harry B. Barrett, St. Louis, Mo.

Application August 28, 1950, Serial No. 181,783

6 Claims. (Cl. 154—1)

1

This invention relates in general to brake shoe relining devices and, more particularly, to a bench type of machine for effecting the bonding of a brake lining to a brake shoe by means of thermosetting adhesive or the like.

It is the primary object of the present invention to provide a brake shoe relining machine which is adapted for use with automotive brake shoes of varying size and which integrally incorporates a heating element for applying heat directly to the adhesive zone to cure the bonding material thereby obviating the utilization of ovens as is necessary with currently practiced relining methods.

It is a further object of the present invention to provide a brake shoe relining machine which contains pressure applying means for maintaining the brake lining segments in snug, even position upon the brake shoes during the bonding period thereby preventing the development of distortion, air pockets, irregular bonding, or like deformation.

It is an additional object of the present invention to provide a brake shoe relining machine which may be economically manufactured, and which may be easily operated by a mechanic at his bench.

With the above and other objects in view, my invention resides in the novel featuers of form, construction, arrangement, and combination of parts presently described and pointed out in the claims.

In the accompanying drawings (two sheets)—

Figure 3 is a fragmentary transverse sectional view taken along line 3—3 of Figure 1;

Figure 4 is a fragmentary sectional view of the heating element;

Figure 5 is a fragmentary sectional view taken along line 5—5 of Figure 4; and

Figure 6 is a top plan view illustrating the machine in extended operative position.

Figure 1:
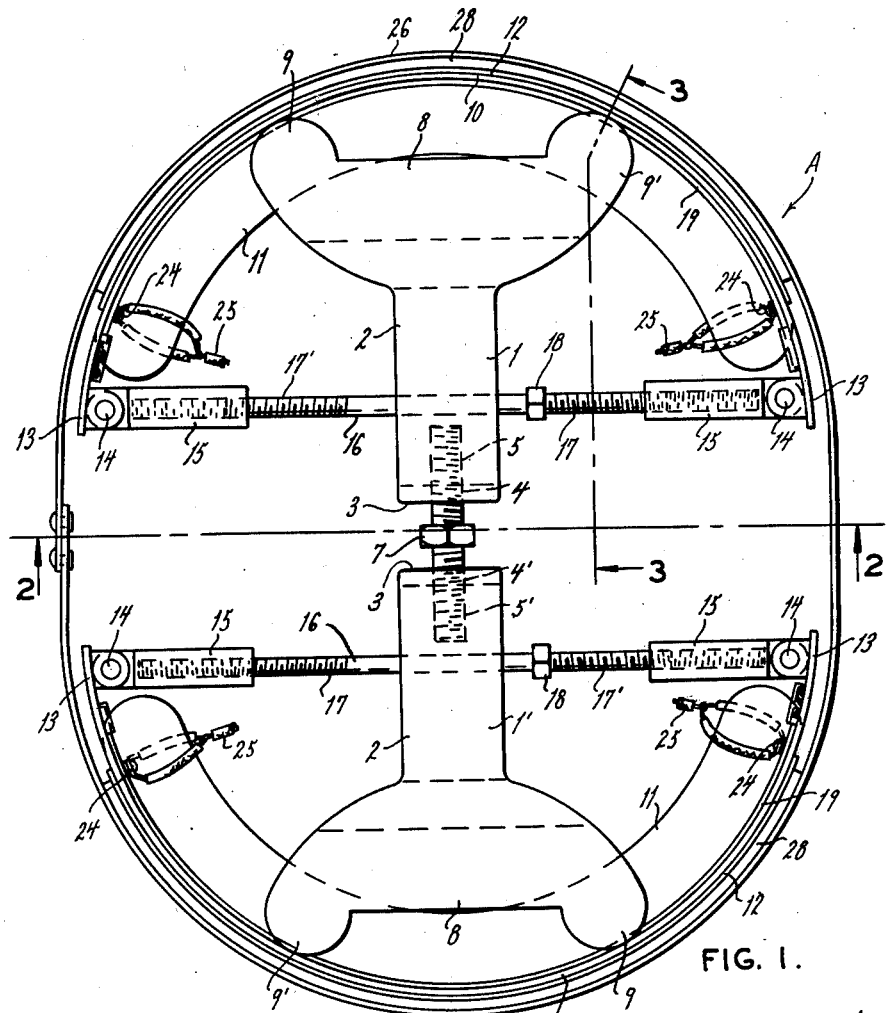
Figure 1 is a top plan view of a brake shoe relining machine constructed in accordance with and embodying the present invention.
Figure 2:
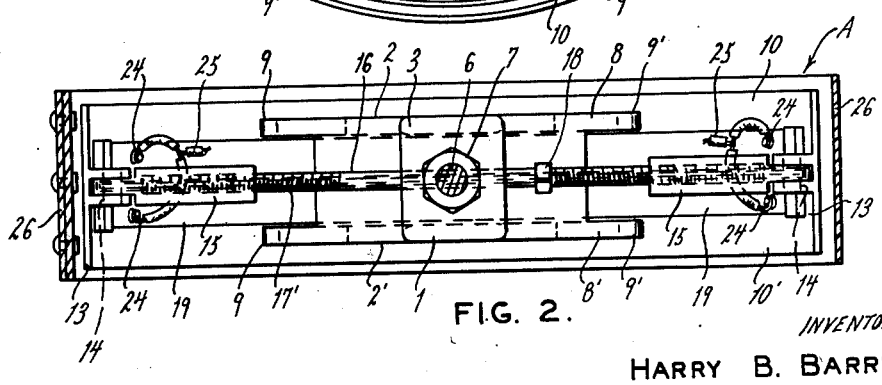
Figure 2 is a transverse sectional view taken along line 2—2 of Figure 1.

Referring now by reference characters to the drawings which illustrate a preferred embodiment of the present invention, A designates a brake shoe relining machine incorporating a pair of oppositely presented, axially aligned U-shaped members or clevises 1, 1', each having side plates 2, 2', and a base web 3. Tapped in the base web 3 of each clevis 1, 1', are apertures 4, 4', respectively, for receiving the oppositely threaded

2 shanks 5, 5', of a turn-buckle type screw 6 integrally provided with a central hexagonal portion 7. By threading the screw 6 in the direction desired, the distance between the clevises 1, 1', may be regulated for purposes appearing more fully hereinafter.

Formed integrally on the upper end of each side plate 2, 2', are mounting heads 8, 8', respectively, having arcuately shaped upwardly projecting bosses 9, 9', at their opposite ends. Shiftably supported on each pair of bosses 9, 9', is an arcuately presented flexible band 10, 10', respectively, fabricated of relatively heavy gauge metal, and spaced from each other by a distance somewhat greater than the thickness of the web 11 of an automotive brake shoe 12 seatingly disposed upon the bands 10, 10', with the web 11 extending therebetween, as may be seen in Figure 3. As of their lower end portions the bands 10, 10', are cross-connected by lugs 13 having inwardly projecting spaced parallel eyes for receiving a cross pin 14 upon which is swivelly mounted an internally threaded sleeve 15.

Rotatably mounted in and extending through clevises 1, 1', are turn-buckle screws 16 having oppositely threaded end portions 17, 17', operatively mounted in opposed sleeves 15, as best seen in Figure 1. Integrally provided on each turn-buckle screw 16 is enlarged hexagonal portion 18 for receiving a wrench or other suitable type tool for effecting threading of the screw 16 in the direction desired. It will thus be seen that by operation of the screw 16, the bands 10, 10', may be optionally flexed into an arc of any selected radius within a prescribed limit for accommodating various different sizes of brake shoes to assure snug fitting, fully supported engagement with the underface thereof.

Mounted in face-wise contact against the underface of each band 10, 10', is an electrical heating element 19 consisting of a central relatively narrow flat strip 20 provided along its longitudinal margins with a series of uniformly spaced notches 21 for receiving a zig-zag winding of nichrome ribbons 22. Securely held on opposite sides of the strip 20 by rivets or other suitable securement means are relatively wide, protecting facing strips 23, preferably formed of sheet-like material. Suitably mounted upon the underface of the bands 10, 10', and conductively connected to the heating element 19, are binding posts 24 for securement to electrical leads 25 connected to a conventional electrical outlet (not shown).

Provided for encircling disposition about the outerfaces of the brake shoes 12 is a continuous ring or band 26 fabricated preferably of sheet steel having sufficient tensile strength to resist extension and suitable flexibility to allow it to conform to the curvature of the brake shoes 12. The ring 26 is of substantially the same width as the brake shoes 12 in order to apply pressure thereto throughout their outer surface, for reasons appearing more fully hereinafter.

In use, the brake shoes 12 to be relined are seated upon the flexible bands 10, 10', which are adjusted by operation of the turn-buckle screws 16 to effect flush surface engagement with the underface of the brake shoes 12 through their length. The particular type bonding adhesive, generally designated 27, is then applied to the outerface of the brake shoe 12 in any conventional manner. Lightly placed upon the adhesive coating 27 on each brake shoe 12 is a preformed brake lining segment 28. Thereupon the continuous ring 26 is disposed surroundingly about the pair of brake shoes 12 in surface abutment against the outerface of the brake lining segments 28. The turn-buckle screw 6 is then turned to effect extensive movement of the clevises 1, 1', for forcing the brake shoes 12 against the ring 26, which is not expanded by the force exerted. such movement causes the brake lining segments 28 to be pressed against the outerface of the brake shoes 12 with the bonding adhesive 27 interposed therebetween. Under the force of the outward or expanding movement of the clevises 1, 1' the continuous ring 26 is caused to be adapted to the curvature of the brake shoes 12, thereby exerting a uniform pressure over the entire area of the brake lining segments 28.

With the brake lining 28 maintained in disposition against the brake shoe 12, the operator will then turn on the electricity to cause energization of the heating element 19, which causes heat to be applied directly to the brake shoes 12 throughout their length, which is readily transferred through the brake shoes 12 to the bonding material 27 for curing thereof. It may be seen that by conventional resistor and switch means the temperature utilized and the duration of bonding period may be easily controlled as necessary for the particular type of bonding adhesive utilized.

As thus described, the machine A is a wholly self-contained unit which incorporates means for applying uniform pressure to the brake linings and heating means for curing the bonding adhesives, which operational steps may be accomplished at a mechanic's work bench, thus obviating the necessity of utilizing relatively expensive heating ovens, which are expensive and waste heat. The machine A, can be used in quantity by a mechanic in order to effect a plurality of practically simultaneous relining operations, whereby a marked economy over the utilization of currently available equipment will be effected.

It should be understood that changes and modifications in the form, construction, arrangement and combination of the several parts of the brake shoe relining device may be made and substituted for those herein shown and described without departing from the nature and principle of my invention.

Having thus described my invention, what I claim and desire to secure by Letters Patent is:

1. A machine for effecting the adherence of linings to automotive brake shoes by thermosetting adhesives comprising a mounting head, a flexible substantially semi-circular shoe-supporting band carried by the mounting head, a heating element disposed upon the under face of the band between said mounting head and the brake shoe for supplying heat to the brake shoe to cure the adhesive, adjustment means carried by and extending across the mounting head and engaged at its opposite ends with the opposite ends of the band for varying the curvature of the band to support the brake shoe throughout its length, and means for applying external pressure to the brake lining to force it tightly upon the band.

2. A machine for effecting the adherence of linings to automotive brake shoes by thermosetting adhesives comprising a pair of oppositely presented mounting heads, a flexible substantially semi-circular brake shoe supporting band carried by each mounting head, heating elements associated with each mounting head for applying heat to the surface of the brake shoes throughout their length to cure the adhesive, an endless ring disposed encirclingly about the brake shoes in abutment on their inner surface against the brake linings, adjustment means carried by and extending across the mounting head and engaged at its opposite ends with the opposite ends of the band for varying the curvature of the band to support the brake shoe throughout its length, and means for moving said mounting heads in axially opposite directions to effect pressure upon the brake linings by the endless ring.

3. A machine for effecting the adherence of linings to automotive brake shoes by thermosetting adhesives comprising a pair of oppositely presented mounting heads for supporting automotive brake shoes, flexible bands disposed upon said mounting heads between said mounting heads and the brake shoes, a heating element mounted upon the flexible bands for applying heat to the brake shoes to cure the adhesive, means for adjusting said bands for maintaining snug surface abutment between said bands and the under surface of the brake shoes throughout their length, an endless flexible ring disposed encirclingly about the brake shoes supported upon the mounting heads in surface engagement with the brake linings to be adhered, and means for moving the mounting heads in axially opposite directions for creating pressure upon the brake linings by the endless ring whereby the linings will be maintained in position upon the brake shoes during the curing period.

4. A machine for effecting the adherence of linings to automotive brake shoes by thermosetting adhesives comprising a pair of oppositely presented mounting heads for supporting automotive brake shoes, a pair of spaced parallel flexible bands disposed upon and arcuately around each of said mounting heads between said mounting heads and the brake shoes, each pair of bands being secured together at the ends in the provision of a unitary arcuate member having a medial peripheral slot for receiving the web of the brake shoe and thereby permitting the under concave face of the brake shoe flange to rest snugly against the outer curved face of the pair of bands, a heating element mounted upon each pair of flexible bands for applying heat to the brake shoes to cure the adhesives, means for adjusting each pair of bands for maintaining snug surface abutment between said bands and the under surface of the brake shoes throughout their length, and an endless flexible ring disposed encirclingly about the brake shoes supported upon the mounting heads in surface engagement with the brake linings to be adhered, and means for moving the mounting heads in axially opposite directions for creating pressure upon the brake linings by the endless ring whereby the linings will be maintained in position upon the brake shoes during the curing period.

5. A machine for effecting the adherence of linings to automotive brake shoes by thermosetting adhesives comprising a pair of oppositely presented mounting heads for supporting automotive brake shoes, said mounting heads each being transversely slotted across its outer face, a pair of spaced parallel flexible bands disposed upon and arcuately around each of said mounting heads between said mounting heads and the brake shoes, each pair of bands being secured together at the ends in the provision of a unitary arcuate member having a medial peripheral slot in line with the slot of the mounting head and forming therewith a clearance space for receiving the web of the brake shoe and thereby permitting the under concave face of the brake shoe flange to rest snugly against the outer curved face of the pair of bands, a heating element mounted upon each pair of flexible bands for applying heat to the brake shoes to cure the adhesives, means for adjusting each pair of bands for maintaining snug surface abutment between said bands and the under surface of the brake shoes throughout their length, an endless flexible ring disposed encirclingly about the brake shoes supported upon the mounting heads in surface engagement with the brake linings to be adhered, and means for moving the mounting heads in axially opposite directions for creating pressure upon the brake linings by the endless ring whereby the linings will be maintained in position upon the brake shoes during the curing period.

6. A machine for effecting the adherence of linings to automotive brake shoes by thermosetting adhesives comprising a pair of oppositely presented mounting heads for supporting automotive brake shoes, flexible bands disposed upon said mounting heads between said mounting heads and the brake shoes, a heating element mounted upon the flexible bands for applying heat to the brake shoes to cure the adhesive, turn-buckle screws rotatably mounted in and extending transversely across said mounting heads and being provided on their opposite ends with internally threaded sleeves, said sleeves in turn being operatively connected at their outer ends to the flexible bands for adjusting said bands for maintaining snug surface abutment between said bands and the under surface of the brake shoes throughout their length, an endless flexible ring disposed encirclingly about the brake shoes supported upon the mounting heads in surface engagement with the brake linings to be adhered, and means for moving the mounting heads in axially opposite directions for creating pressure upon the brake linings by the endless ring whereby the linings will be maintained in position upon the brake shoes during the curing period.

HARRY B. BARRETT.

REFERENCES CITED

The following references are of record in the file of this patent:

UNITED STATES PATENTS

| Number | Name | Date |
|---|---|---|
| 2,358,483 | Tilden | Sept. 19, 1944 |
| 2,416,427 | Bonawit et al. | Feb. 25, 1947 |
| 2,444,191 | Friberg | June 29, 1948 |
| 2,489,496 | O'Brien | Nov. 29, 1949 |
| 2,498,937 | Barrett | Feb. 28, 1950 |